SUSTAIN — BOOST SYSTEM

BOOST — SUSTAIN SYSTEM

Robert L. Glick
Robert E. Askins
INVENTORS

July 1, 1969   R. L. GLICK ET AL   3,452,544
BISTABLE SOLID PROPELLANT ROCKET MOTOR
Filed Dec. 27, 1966   Sheet 2 of 3

Robert L. Glick INVENTORS
Robert E. Askins

BY *(signature)*

ATTORNEY

Robert L. Glick INVENTORS
Robert E. Askins

United States Patent Office 3,452,544
Patented July 1, 1969

3,452,544
BISTABLE SOLID PROPELLANT
ROCKET MOTOR
Robert L. Glick and Robert E. Askins, Huntsville, Ala.,
assignors to Thiokol Chemical Corporation, Bristol, Pa.,
a corporation of Delaware
Filed Dec. 27, 1966, Ser. No. 604,892
Int. Cl. F02k 9/04
U.S. Cl. 60—254                                    6 Claims

ABSTRACT OF THE DISCLOSURE

A solid propellant rocket motor having therein a single solid propellant grain configuration having thrust boost-sustain and sustain-boost trajectory capabilities that are achieved by the use of alternately activated gas generator or quenching mechanisms that are mounted on the solid propellant rocket motor and have communication with the combustion chamber therein.

---

This invention relates to improvements in solid propellant rocket motors and more particularly to a solid propellant rocket motor wherein one solid propellant grain configuration is utilized to achieve boost-sustain and sustain-boost trajectories, as well as the thrust for the solid propellant rocket motor in the performance of its required operation programs.

In many programs involving solid propellant rocket motors, there is a need for variations in the thrust of the solid propellant rocket motor to provide boost-sustain or sustain-boost trajectories during the flight of the solid propellant rocket motor. At the present time such variations in the boost-sustain or sustain-boost trajectories are achieved in a preprogrammed manner by means of several different approaches. Such approaches including dual grain rocket motors, special grain designs or by use of two or more separate solid propellant rocket motors.

An object of the invention, therefore, is to provide one simple grain configuration for a solid propellant rocket motor that will achieve variations in the boost-sustain or sustain-boost trajectories, as well as the thrust of the solid propellant rocket motor.

The solid propellant rocket motor embodying this invention is thus, by the use of command actions, able to possess variations in thrust level controls.

There are certain propellants that possess unique characteristics in that they have a usable pressure range within a region where the pressure exponent is greater than one. Furthermore, for pressures that are above or below this range the pressure exponent is less than one. The solid propellants meeting these requirements are fluorocarbon solid propellants, also referred to as bistable solid propellants and solid propellants containing metallic fibers. Thus by using these characteristics of the above referred to solid propellants the solid propellant rocket motor embodying the invention is able to achieve dual level thrust operation.

It is believed that further objects and advantages that are inherent with the solid propellant rocket motor embodying the invention will become apparent to one skilled in the art upon careful study of the following description thereof when taken into consideration with the accompanying drawings in which.

Figure 1:
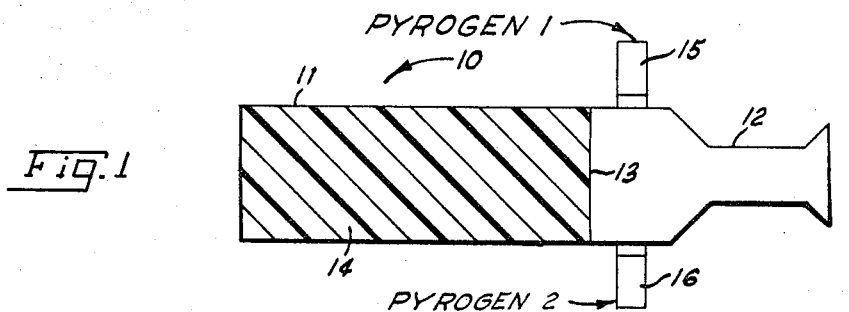
FIGURE 1 is a schematic view of a solid propellant rocket motor embodying the invention.

Referring more in detail to the drawings wherein like parts are designated by like reference numerals, the reference numeral 10 in FIGURE 1 is used to designate a solid propellant rocket motor embodying the invention.

The rocket motor 10 includes a motor case 11 having a nozzle structure 12 at the aft end thereof and forming therein a combustion chamber 13 that is in direct communication with the nozzle structure 12. There is cast into or otherwise positioned in the combustion chamber 13 of the motor case 11 a solid propellant 14.

Positioned on the motor case 11 and extending outwardly therefrom at right angles thereto in diametrically opposed relation to each other, are a pair of igniters 15 and 16 conventionally referred to as a pyrogen, which is manufactured by Thickol Chemical Corporation.

It has been found that fluorocarbon solid propellants meet the requirements for the type of rocket motor embodying the invention and following is an example of the composition of such a solid propellant that has been successfully used in flight testing a rocket motor of the type embodying the instant invention.

|  | Percent of composition |
|---|---|
| Ammonium perchlorate | 60–62 |
| Aluminum | 14–18 |
| Fluorocarbon binder | 26–20 |

The ballistic operational characteristics of the above described solid propellant enhances the ascending and descending modes of operation of a command control when used in a rocket motor embodying the instant invention and under proper command control will thus provide unusual characteristics for the rocket motors that are not available when other types of solid propellant are utilized. It has been determined that the instant solid propellant burns in a unique manner, making the operation of the rocket motor highly acceptable for the operation as will be described.

Figure 1A:
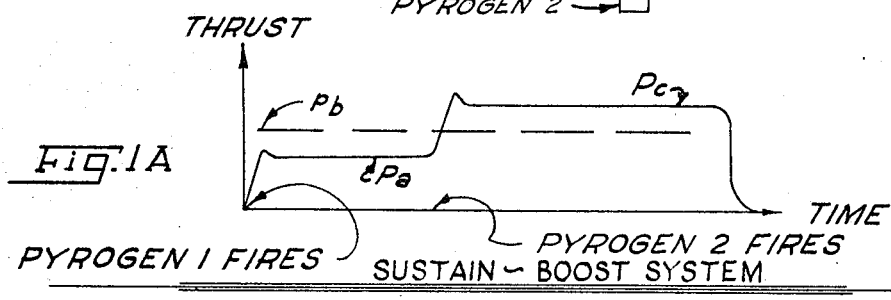
FIGURE 1A is a schematic diagram illustrating the operation of a sustain-boost system for the solid propellant rocket motor of FIGURE 1.
Figure 3:
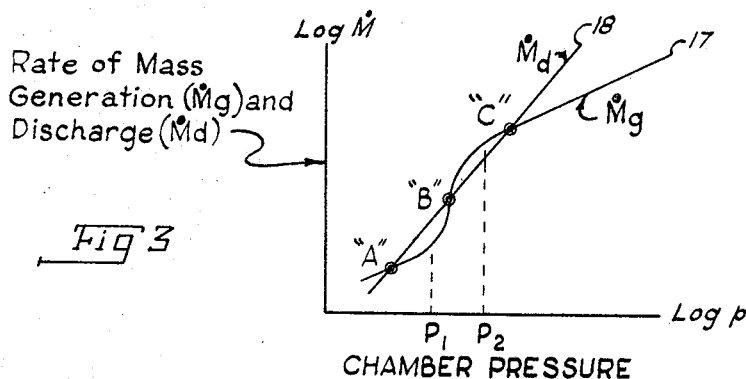
FIGURE 3 is a schematic diagram illustrating the operations of the solid propellant rocket motors embodying the invention.

Considering FIGURES 1A and 3 the diagrams clearly exemplify the operation of the rocket motor of FIGURE 1.

It is a well-known fact that the stable operating points of a solid propellant rocket motor occur at the intersections of the characteristic curves representing the mass generation (MG) from the burning solid propellant and the mass discharge (MD) of the nozzle 12. FIGURE 3 shows the relationship between the rates of the mass generation and mass discharge from the nozzle 12 and the chamber pressure of the combustion chamber 13 of the solid propellant rocket motor 10 when it contains a fluorocarbon solid propellant 14 possessing the unique characteristics previously discussed. The mass generation characteristic line 17 has a high exponent region that lies between pressures $P_1$ and $P_2$ and as shown, the mass discharge characteristic of the rocket motor is essentially best illustrated by a straight line, as shown at 18. It is shown, therefore, that there are three points of intersections A, B and C of the mass generation line 17 and the mass discharge line 18 and for a stable operation of the rocket motor 10, these are the optimum intersections of the mass generation line 17 and the mass discharge line 18 and it is essential that any small perturbations about the operating points A, B, C, as shown by the curves in line 17, always return naturally to reconcilliation with the same point A, B, or C. However, stable operation can occur only at those points where the slope of the mass discharge line 18 is greater than the slope of the mass generation line 17.

As previously set forth, the stable operating points A and C, however, occur only at the intersections of the mass generation line 18 and mass discharge line 17. However, to describe the aspect of the invention and to follow the operation thereof, it is necessary to consider the curves of mass generation or mass discharge per unit area of the burning surface of the solid propellant and the throat area of the nozzle. In this instance, stable operating points A and C occur at intersections of the mass generation line 18 which indicates the unit area of the burning surface of the solid propellant and the mass discharge line 17 which indicates the unit area of the nozzle throat. There are times, however, as shown in FIGURE 3, when the stable operating pressure of the mass discharge is greater than the pressure of the mass generation and it is these operational characteristics that are present in the rocket motor embodying the invention.

The slope of the mass discharge line 18 is greater than the slope of the mass generation line 17 at points A and C. Therefore, points A and C are points of stable operation of the rocket motor. However, at point B the slope of the mass discharge line 18 is greater than the slope of the mass generation line 17 so that point B is not a stable operating point. Thus, if during the operation of the rocket motor the pressure in the combustion chamber 13 fall to a pressure $P_1$ less than the pressure at point B, the operation of the rocket motor will tend to move towards the stable operating point A, however, if the operation of the rocket motor is established at some pressure $P_2$ slightly greater than point B, the operation of the rocket motor will tend to move towards the stable operating point C. Therefore, by suitably perturbing the system so that it will fall either above a pressure line $Pb$ to a pressure line $Pc$ or below the pressure line $Pb$ to a pressure line as at $Pa$, the operation of the system can be switched from stable operating point A to stable operating point C.

With the variations between the line 17 of mass generation and the line 18 of mass discharge in mind, as well as the pionts of intersection of these lines at A, B, C, the operation of the solid propellant rocket motor in a sustained-boost system as shown in FIGURE 1A is as follows:

To maintain the requirements of a sustain-boost system, it is necessary that two pyrogens 15 and 16, also designated as pyrogen 1 and pyrogen 2, must be utilized.

First pyrogen 1, 15 will be energized to ignite the solid propellant grain 14. The ignition characteristics of pyrogen 15 are such that actuation thereof with subsequent ignition of the solid propellant grain 14 will not cause the pressure in the combustion chamber 13 to exceed the pressure indicated by the pressure line $Pb$. The operation of the system, therefore, after the ignition of the solid propellant grain 14 will be at the lower stable pressure line $Pa$. Thus during this condition of operation, the rocket motor 10 will follow the low thrust operating pressure line $Pa$ and thus will sustain the required trajectory to meet desired operational requirements. However, when it is desired to obtain the boost portion of the trajectory as indicated by the pressure line $Pc$, pyrogen 2, by a command performance, will be actuated and thus will cause the pressure in the combustion chamber to be increased to the pressure line $Pc$, a pressure line higher than the pressure line $Pb$. This will cause the pressure of the system to increase toward the high pressure stable point C, pressure line $Pc$ and the boost portion of the trajectory is achieved. While it has been stated that the firing of pyrogen 2 can be command initiated, the firing of pyrogen 2 may be preprogrammed by installing into the rocket motor a self-contained controlled system that will actuate pyrogen 2 without the necessity of a command control for pyrogen 2.

In FIGURES 1 and 1A, there has been shown and described a sustain-boost system for the rocket motor embodying the invention, now FIGURES 2 and 2A will be referred to wherein a boost-sustain system for the rocket motor embodying the invention will be described.

Figure 2:
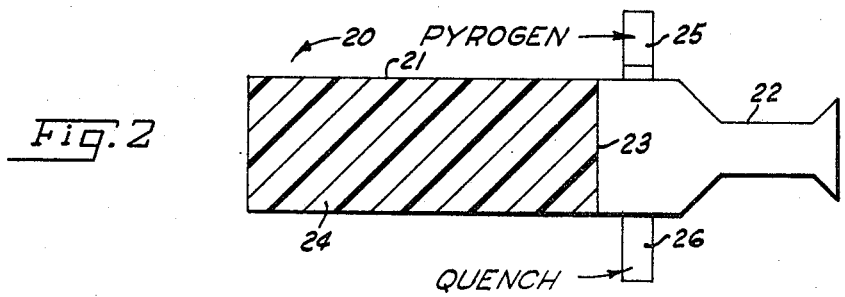
FIGURE 2 is a schematic view of a modified version of a rocket motor embodying the invention.

In FIGURE 2 a solid propellant rocket motor 20 is illustrated and this form of the rocket motor is similar in some respects to the rocket motor 10 in that it includes a motor case 21, a nozzle structure 22, a combustion chamber 23 in the motor case 21 and a solid propellant 24 in the combustion chamber 23.

In this form of rocket motor, however, only one igniter or pyrogen 25 is used and in lieu of the second pyrogen, a quench mechanism 26 is installed on the motor case 21. As previously described, the pyrogen 25 and quench mechanism 26 extend outwardly from the motor case 21 at right angles thereto in diametrically opposed relation to each other.

Bearing in mind the various points outlined previously, the operation of this form of the invention will be carried out as follows:

At ignition of the solid propellant 24 by the pyrogen 25, the pressure in the combustion chamber 23 is caused to rise to the pressure line $Pc$ which is above the pressure line $Pb$; therefore, the operation of the rocket motor 20 will occur at the high pressure stable operating point C, FIGURE 3, and the boost phase of the trajectory of the rocket motor 20 will be achieved. However, when it is desired to make use of the sustain portion of the trajectory of the rocket motor 20, the quench mechanism 26 is actuated and the quenchant therein is released into the combustion chamber 23. This will momentarily affect the burning of the solid propellant 24 and subsequently cause the pressure in the combustion chamber 23 to decrease below the pressure line $Pb$ to the pressure line $Pa$. Thus the operation of the rocket motor 20 will conform with the lower stable pressure indicated by the pressure line $Pa$ and the sustain portion of the trajectory of the rocket motor 20 will be achieved. It will be apparent, however, that many variations of both systems may be achieved by utilizing different combinations that will result in different trajectories than those described and such trajectories may also be accomplished by using both high and low burning rate types of solid propellant. Thus means, pyrogens and a quench mechanism have been described whereby the utilization of either or both of these means will alter or control the trajectories of the rocket motor embodying the invention.

Figure 4:
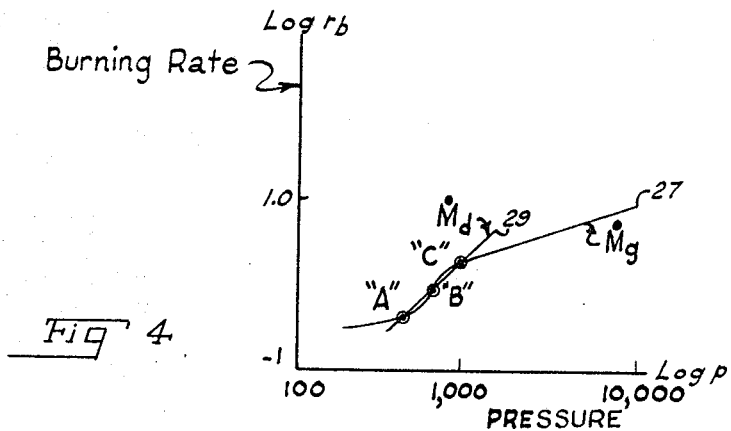
FIGURE 4 is a schematic diagram illustrating the operations of the rocket motors embodying the invention wherein a fluorocarbon or bistable solid propellant is utilized.
Figure 5:
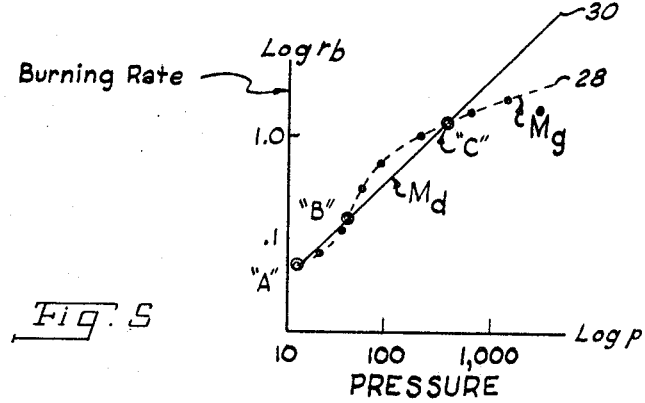
FIGURE 5 is a schematic diagram illustrating the operations of the rocket motors embodying the invention wherein a solid propellant containing fibers is utilized.

FIGURE 4 is used to illustrate a burning rate pressure curve when a fluorocarbon solid propellant is utilized and FIGURE 5 is used to illustrate a burning rate pressure curve when a solid propellant containing fibers is utilized. These curves are characteristic of the pressure burning rate that can be achieved and variations of these curves can be achieved by variations in the composition of the solid propellant utilized.

However, in both instances, if the area of the burning surface can be made to remain constant, then the burning rate of the solid propellant is directly proportional to the rate of the mass generation in the combustion chamber of the rocket motor. Thus it will be apparent that the burning rate pressure within the combustion chamber of the rocket motor will be in proportion to the rate of mass generation in the combustion chamber of the rocket motor as indicated by the mass generation lines 27 and 28 in FIGURES 4 and 5. The intersection points A, B and C in these figures with the mass generation lines 27 and 28 and with the mass discharge lines 29 and 30 indicate the manner in which the burning rate characteristics intersect with the mass discharge lines 29 and 30, and clearly indicate the control that may be achieved for the rocket motor embodying the invention.

It will also be apparent from a study of FIGURES 4 and 5 that the range of operations that are obtainable by the rocket motor embodying the invention are dependent upon the characteristics of the particular solid propellant that is installed in either of the rocket motor 10 or 20.

It has been clearly set forth how variations in boost-sustain or sustain boost trajectories can be obtained without using a complex solid propellant grain configuration, but by using a fluorocarbon solid propellant having certain well-known characteristics, such variations can be easily obtained.

It is also possible to employ a fluorocarbon or bistable propellant to enhance the thrust-level changes that are usually obtained by conventional methods using normal propellants.

Figure 6:
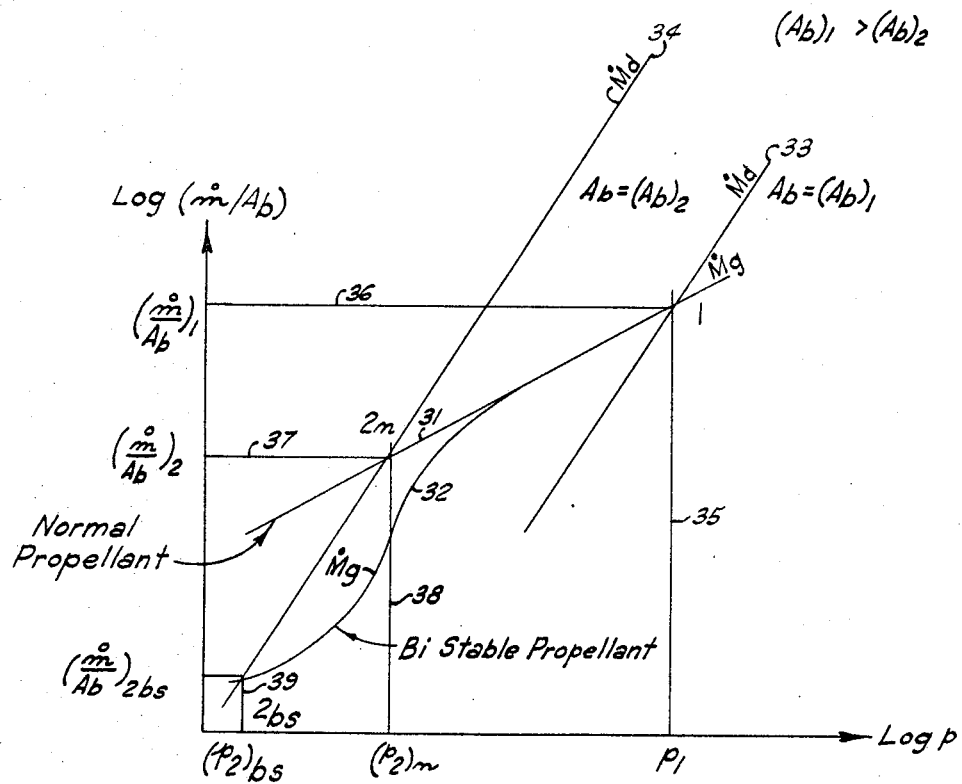
FIGURE 6 is a schematic diagram of the operation of a conventional solid propellant and a fluorocarbon or bistable solid propellant in a rocket motor embodying the invention.

In FIGURE 6 line 31 represents the mass generation per unit area of the burning surface for normal propellant, line 32 represents the mass generation per unit of burning surface area for a fluorocarbon or bistable solid propellant, and lines 33 and 34 represent the mass discharge per unit area of the burning surface lines for burning surface areas $(A_b)_1$ and $(A_b)_2$ respectively.

It will be seen, therefore, that equilibrim operating point 1 is established at the intersection of lines 33, 32 and 31. Therefore, point 1 represents a stable operating point for either normal or bistable propellant. Thus, the initial operating point of the rocket motor, the boost phase, is established at $P_1$ line 35 for similar motors containing either normal or bistable propellant.

When the sustain portion of the trajectory is achieved by a change in the solid propellant grain configuration which reduces the area of the burning surface from $(A_b)_1$, line 36 to $(A_b)_2$, line 37 the operating point of the solid propellant rocket motor containing normal propellant changes from point 1 to point $2n$ line 38 and the operating point of the solid propellant rocket motor containing bistable propellant changes from point 1 to point $2bs$, line 39. Thus, with normal propellant the second thrust is proportional to $P_{2n}$, line 38 while the use of a bistable propellant provides a second thrust that is proportional to $P_{2bs}$, line 39. It is clearly evident that a bistable propellant yields a considerably larger thrust level change than is achieved by the use of a normal propellant.

Figure 2A:
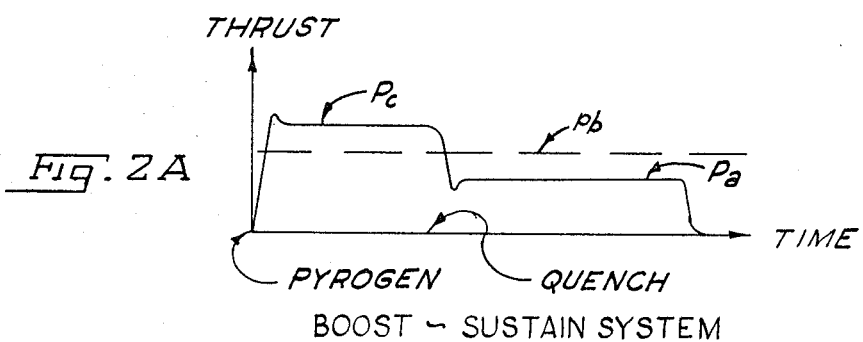
FIGURE 2A is a schematic diagram illustrating the operation of boost-sustain system for the solid propellant rocket motor of FIGURE 2.
Figure 7:
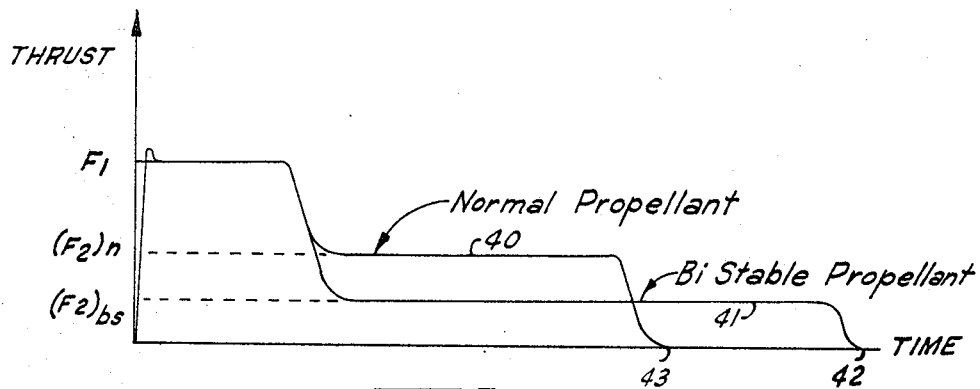
FIGURE 7 is a schematic diagram of thrust time for a boost sustain rocket motor embodying the invention the invention with the use of conventional solid propellant and a fluorocarbon or bistable solid propellant.

If, therefore, a comparison is made between FIGURES 2A and FIGURE 7, wherein a thrust diagram is used to illustrate a thrust control for a rocket motor embodying the invention, it will be seen that at ignition a normal solid propellant will provide a thrust as shown by line 40, wherein $F_1$ is equal to $Pc$ and a fluorocarbon solid propellant will provide a thrust as shown by line 41, wherein $F_1$ is equal to $Pc$. The line 40 will be maintained at $F_{2n}$ which is equal to $Pb$ while the line 41 for the fluorocarbon propellant will be maintained at $F_{2bs}$ which is equal to $Pa$. Thus, the thrust time as indicated by $F_1$, $F_{2n}$ and $F_{2bs}$ will be achieved as shown by lines 40 and 41 in the operational time of a rocket motor.

It will be apparent, therefore, that the thrust time 42 of a rocket motor using a fluorocarbon propellant greatly exceeds the thrust time 43 of a rocket motor using a normal propellant. Moreover, the thrust ratio achievable with a fixed grain configuration and bistable propellant $F_1/F_{2bs}$ is much greater than the thrust ratio achievable with the same grain configuration and normal propellant $F_1/F_{2n}$.

It will be clearly seen, therefore, that a motor embodying the invention and using therein a fluorocarbon propellant possesses many advantages that can not be achieved by a solid propellant rocket motor that utilizes a normal solid propellant.

The boost-sustain and sustain-boost trajectories can be more readily controlled and the thrust control will be manipulated to far exceed the control that is possible with a rocket motor using a normal solid propellant.

It is believed that from the foregoing description the operation and characteristics of a rocket motor embodying the invention will be clear to one skilled in the art and it is to be understood that variations in the operational control of such a rocket motor may be achieved provided such variations fall within the spirit of the invention and the scope of the appended claims.

Having thus described the invention what is claimed as new and desired to be obtained by Letters Patent is:

1. A solid propellant rocket motor including a motor case having a nozzle at one end thereof, said motor case having a combustion chamber containing a single, bistable, fluorocarbon propellant capable of burning at a sustainer rate and a booster rate and plural, alternately-actuated control means mounted on said motor case and communicating with said combustion chamber for controlling the burn rate of said solid propellant and the thrust of said motor.

2. A bistable solid propellant rocket motor as in claim 1, wherein the thrust of said rocket motor is of the sustain-boost type and the control means comprises a pair of hot gas generators.

3. A bistable solid propellant rocket motor as in claim 1, wherein said generators are mounted on said motor case so that they extend outwardly thereof at right angles thereto in diametrically opposed relation to each other.

4. A bistable solid propellant rocket motor as in claim 1, wherein the thrust of said rocket motor is of the boost-sustain type and the control means comprises a hot gas generator and quench mechanism.

5. A bistable solid propellant rocket motor as in claim 1, wherein said generator and said quench mechanism are mounted on said motor case so that they extend outwardly thereof at right angles thereto in diametrically opposed relation to each other.

6. a bistable rocket motor as in claim 1, wherein the fluorocarbon solid propellant in said combustion chamber includes the following ingredients 60-62% of ammonium perchlorate, 14 to 18% of aluminum and 26 to 20% of a fluorocarbon binder.

References Cited
UNITED STATES PATENTS

| | | | |
|---|---|---|---|
| 3,102,386 | 9/1963 | Proell | 60—254 XR |
| 3,167,912 | 2/1965 | Ledwith | 60—254 XR |
| 3,255,059 | 6/1966 | Hameresh et al. | 149—19 |
| 3,283,510 | 11/1966 | Mangum et al. | 60—251 XR |
| 3,287,912 | 11/1966 | Wehlow et al. | 60—39.47 XR |
| 3,351,505 | 11/1967 | Shapiro et al. | 149—44 XR |
| 3,354,647 | 11/1967 | Ayock | 60—254 XR |

CARLTON R. CROYLE, *Primary Examiner.*

U.S. Cl. X.R.
149—19, 20, 44